May 19, 1953  M. M. KINLEY ET AL  2,638,681
TUBING AND CASING CALIPER
Filed Nov. 12, 1947  2 Sheets-Sheet 2

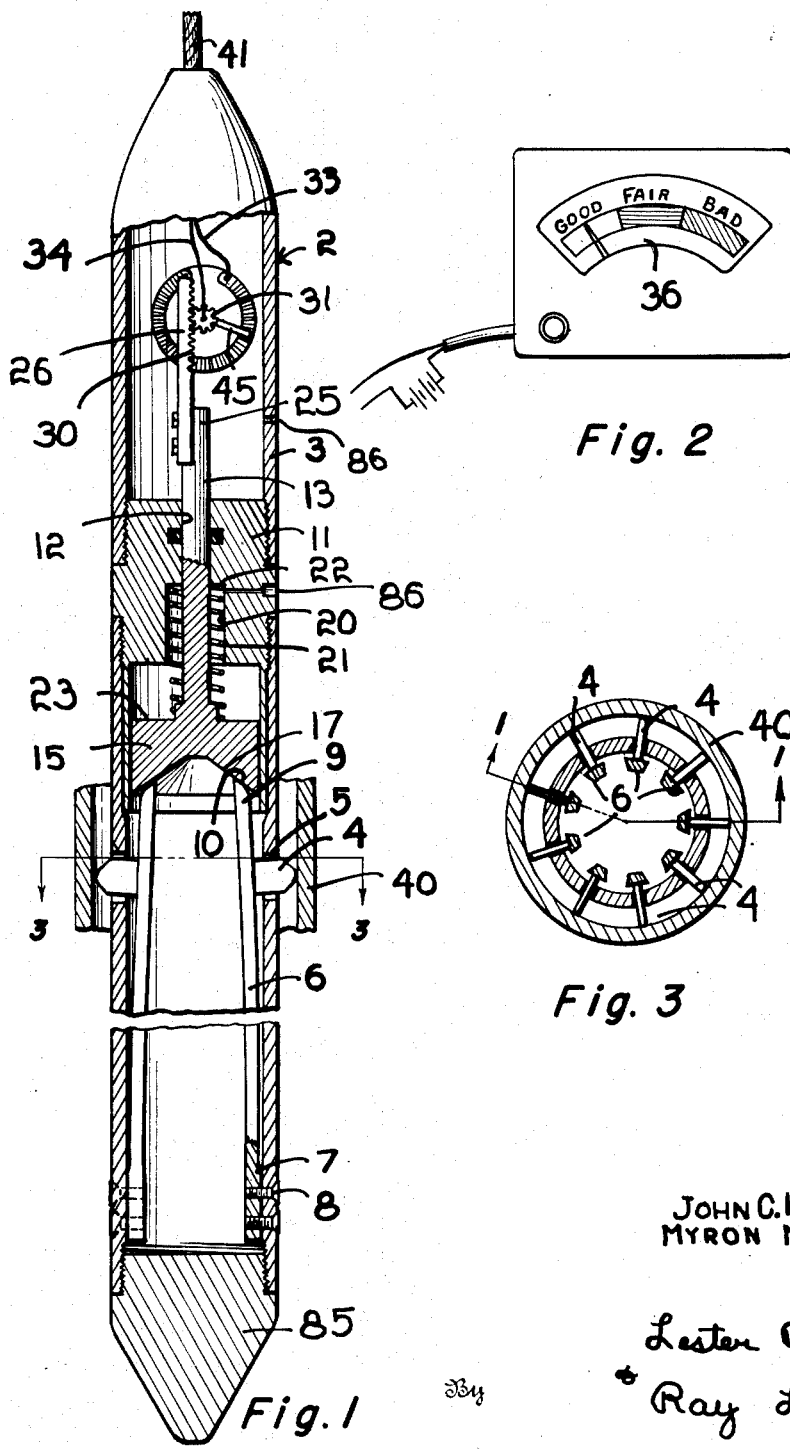

JOHN C. KINLEY
MYRON M. KINLEY
Inventors

By Lester B. Clark
& Ray L. Smith
Attorneys

Patented May 19, 1953

2,638,681

UNITED STATES PATENT OFFICE 2,638,681

TUBING AND CASING CALIPER

Myron M. Kinley and John C. Kinley, Houston, Tex.

Application November 12, 1947, Serial No. 785,212

5 Claims. (Cl. 33—174)

The invention relates to a bore measuring device and in particular to a device for measuring differences in inside radius of pipe or for locating pits, irregularities, depressions or the like, interiorly of tubular members.

After an oil, gas or water well has been drilled, a string of pipe is usually placed in the well bore through which a second string may be inserted by which the fluid from the formation is conducted to the surface where it is transported in pipe lines to be processed or stored in a tank.

As the oil flows upwardly through the flow string minute particles of the formation are carried upwardly therewith and this, along with the corrosive action of the well fluid, and the pressure and temperature within the well string gradually pits and corrodes such string.

It is advantageous to ascertain as closely as possible the condition of the flow string from time to time so that if it becomes pitted or corroded excessively, such condition may be determined and corrected before great damage is done by the well blowing out.

An object of the present invention is to provide a device for locating and measuring pits and irregularities on the interior of tubular members.

Another object of the invention is to provide a bore measuring device operable from a predetermined elevation within a well to indicate the condition of the interior surface of a well string within the bore.

Another object of the invention is to provide in a well bore measuring device a plurality of laterally extending fingers arranged to contact the interior surface of the pipe being tested.

Another object of the invention is to provide in a bore measuring device a plurality of laterally extending fingers arranged to contact the interior surface of the pipe or bore being tested, there being means associated with the contact fingers normally urging them outwardly of the device.

Still another object of the invention is to provide in a well bore measuring device, having contact fingers radially movable as the device is moved axially of the pipe being tested, means movable in response to any radial displacement of any such contact fingers to indicate pits, irregularities and depressions or the like on the interior of the pipe.

Still another object of the invention is to provide in a well bore measuring device, having contact fingers radially movable as the device is moved axially of the pipe being tested, means actuated by radial displacement of any such contact fingers to indicate pits, irregularities and depressions or the like on the interior of the pipe.

Another object of the invention is to provide a bore measuring device operable within the pipe being tested to contact such pipe to indicate pits and irregularities on the interior surface of the pipe as the device is moved axially thereof.

Another object of the invention is to provide in a device for indicating and measuring pits and irregularities on the interior of pipe, means movable by contact fingers as they are radially displaced by movement into a pit or depression or the like to indicate the condition of the interior surface of the pipe.

Another object of the invention is to provide in a bore indicating and measuring device, indicating means operable by radial displacement of contact fingers as they move along the interior surface of a pipe to indicate pits, depressions or the like on such surface.

A further object of the invention is to provide in a well bore measuring device a plurality of contact fingers at different elevations within the device, the fingers at each elevation being circumferentially displaced from the adjacent elevation so that as the device is moved along within a pipe, substantially the whole interior surface thereof will be contacted by at least one of such fingers.

A further object of the invention is to provide in a well bore measuring device, a plurality of contact fingers at different elevations within the device, the fingers at each elevation being circumferentially displaced from the adjacent elevation so that as the tool is moved along within a pipe, substantially the whole interior surface thereof will be contacted by at least one of such fingers, said fingers being arranged to move radially in accordance with the contour of the pipe being tested and means operable by such radial displacement to indicate conditions, such as pits, irregularities or the like within the well pipe.

Other and further objects and advantages of the invention will become more readily apparent from a consideration of the following description and drawings, wherein:

Fig. 1 is a vertical sectional view illustrating an embodiment of the device.

Fig. 2 is a schematic diagram illustrating a form of an indicating means which may be used with the device.

Fig. 3 is a sectional view on the line 3—3 of Fig. 1 illustrating more clearly an arrangement of the contact fingers within the well bore measuring device.

Figures 4, 5, 6:
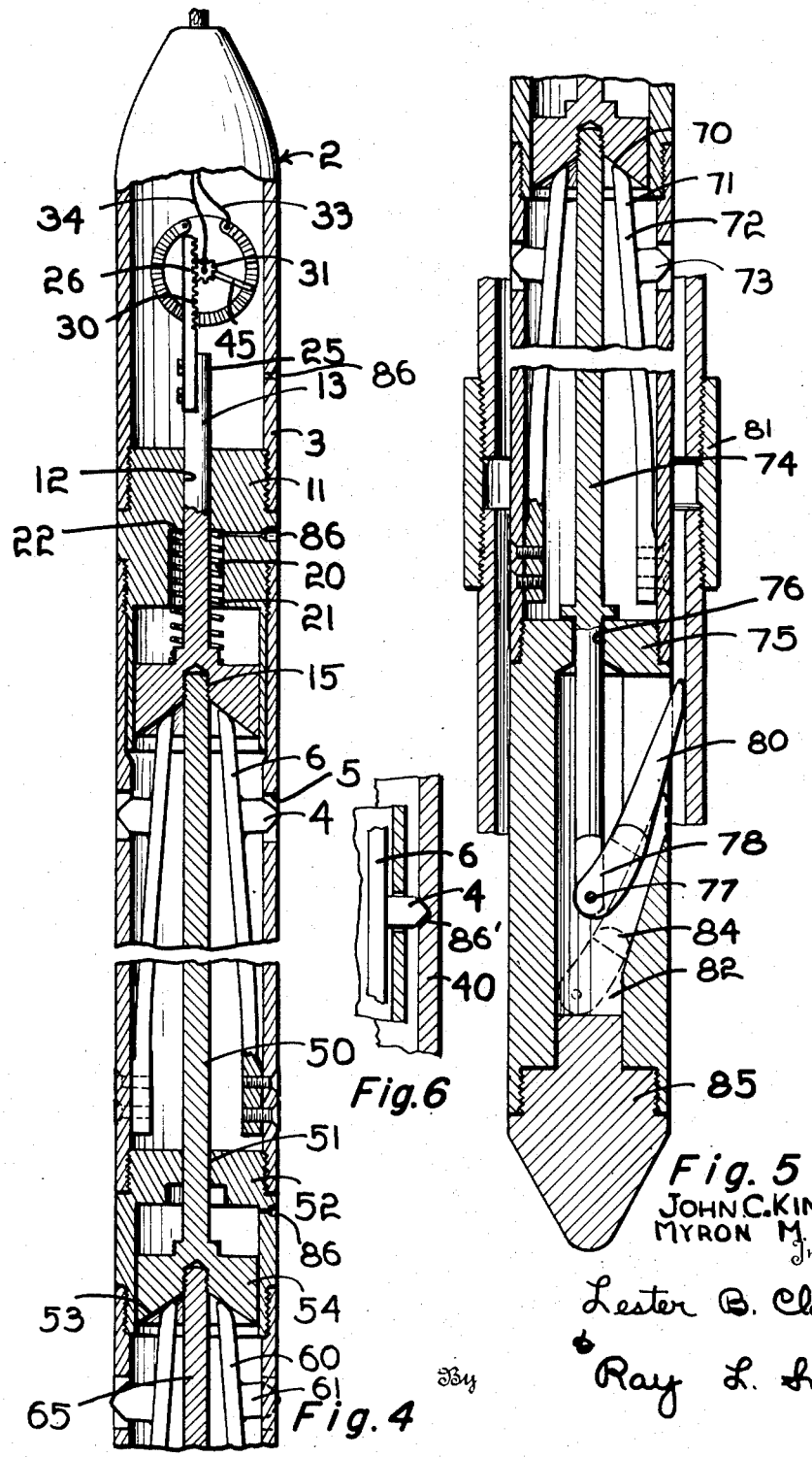
Fig. 4 is a vertical sectional view illustrating an alternate embodiment of the invention wherein a plurality of fingers are placed at different elevations within the device, the contact fingers at each elevation being circumferentially displaced.
Fig. 5 is a vertical elevational view illustrating the bottom portion of the tool shown in Fig. 4 and a form of the means operable at a predetermined elevation within the well bore to release the contact fingers so that they extend outwardly of the periphery of the device and engage the interior surface of the well pipe.
Fig. 6 is a partial vertical sectional view showing one of the contact members fitting within a depression on the interior of a well pipe.

In Fig. 1 the device is shown generally at 2 as comprising a housing or body 3. Within the body and carried thereby, are a plurality of contact members or contact fingers 4 which are urged outwardly through the window 5 of the housing or body 3 by the leaf springs 6 which are secured at 7 to the housing or body 3 by any suitable means, such as bolts 8.

The leaf spring members 6 extend beyond the contact member 4 and the end 9 is tapered inwardly as at 10. A plug 11 secured in the upper part of the housing 3 has an opening 12 therethrough, through which an elongated bar 13 is slidably arranged. The lower end 15 of the shaft or bar 13 is enlarged as shown in Fig. 1 and is provided on the end adjacent the taper 10 of the abutting end 9 of the leaf springs 6 with suitable means such as a cone taper or with a plurality of inclined grooves or slide-ways 17 which is substantially in the same direction as the taper 10 on the end 9 of the abutting leaf springs.

A counterbore 20 in the bore 12 has a coil spring 21 fitting therein and abutting against the shoulder 22 at one end thereof, the other end of the spring resting on the top 23 of the enlarged end 15. Such spring normally tends to urge the enlarged end 15 into sliding contact with the ends 9 of the leaf springs. It seems obvious that the leaf springs 6 are stronger than the coil spring 21, so that while the spring 21 normally urges the enlarged end 15 into sliding contact with the ends 9 of the leaf springs, the leaf springs tend to move the contact fingers 4 outwardly of the housing or body 3. Secured on the upper end 25 of the shaft or bar 13 is a rack 26, having teeth 30 thereon, arranged to engage the pinion 31 which is electrically connected by suitable means through the conductors 33 and 34 to suitable indicating means, such as illustrated at 36 in Fig. 2.

Fig. 3 more clearly illustrates the arrangement of the contact fingers 4 and the leaf springs 6 within the housing or body 3. Any suitable arrangement could, of course, be provided for the contact fingers, but it seems obvious that the larger the number of contact fingers which are engaging the interior surface of the well pipe 40, the better will be the indication of the exact contour of the interior surface thereof.

Secured in the top of the housing 3 is a cable 41 by which the caliper may be lowered axially into a well pipe, thereby obviating the necessity of removing such pipe from within the well bore to determine the condition thereof.

In the operation of the invention, it will be lowered by suitable means, such as a cable 41 into the well pipe 40. As the device is moved axially through the pipe, the contact fingers 4 engage the inner surface thereof whereby such fingers will be radially displaced if they engage any pits, irregularities, or depressions along the interior surface. Radial displacement of the fingers 4 will be transmitted through the enlarged end of the shaft 13, which in turn slides within the bore 12 as an indication that at least one of the contact fingers has moved into a pit or the like.

Such movement raises the rack 26, thereby rotating the engaged pinion 31. The meter 36 electrically connected by the conductors 33 and 34 to the pinion 31 moves in accordance with the movement of indicating finger 45 connected to pinion 1 to indicate the exact condition of the well pipe being tested and gives an accurate measurement of the size pit or irregularity.

In Fig. 4, secured centrally of the enlarged portion 15 of the shaft or bar 13, is another bar or shaft 50 which extends downwardly through the opening 51 of the plug 52 in the housing 3 and is provided on its lower end with an enlarged end 54 which is quite similar to the enlarged end 15 and has a taper 53 in the end thereof which abuts the ends of the leaf springs 60 which are provided with contact fingers 61 and are similar in all respects to the contact fingers 4 and the leaf springs 6 in the upper part of the housing. Extending downwardly from the enlarged portion 54 and secured centrally therein, is a rod 65 which is similar to the aforementioned rods 13 and 50 and abuts at 70 against the ends 71 of leaf springs 72, which are provided with contact members 73 which are quite similar for all practical purposes to the contact fingers 61 and 4.

It is to be noted that a plurality of spaced contact fingers are provided at different elevations within the device. The contact fingers at each elevation within the device may be angularly rotated in a horizontal plane with respect to the next adjacent elevation of contact fingers, so that as the tool is moved axially through a well pipe, substantially the entire surface thereof will be engaged by one or more of the contact fingers.

Secured in the lower end of the rod or shaft 65 is a shaft 74 which extends downwardly into the bottom 75 of the housing 3 through the bore 76, located substantially centrally thereof. Suitable means, such as a shear pin 77 secured in the bottom 75 of the housing 3 and engaged in the lower end 78 of the shaft 74 may be used to retain the contact fingers within the housing 3 as it is being lowered to a predetermined point within the well pipe.

When it is desired to release the contact fingers outwardly through their respective windows in the housing or body 3, a finger 80 may be engaged in the coupling 81 and an upward pull exerted on the tool to shear the pin 77, thereby releasing the shaft 74 so that it may tend to move upwardly as the leaf springs behind each of the contact fingers urge the contact fingers outwardly into engagement with the interior of the wall pipe.

The finger 80 falls into the recess 82 in the bottom 75 of the housing 3, as indicated in dotted line at 84. Suitable means, such as a plug 85 may be secured in the end of the housing as shown in Figs. 1 and 5. A passage 86 is arranged so that as the enlarged ends of the rods move upwardly, any fluid which has collected on the upper side of such enlarged end may be discharged outwardly through such opening and into the well bore.

A similar passage or a bellows, or a cylinder containing a piston, to seal off the contents of the upper chamber from the outside, while equalizing the pressure, may also be provided through the body 3 or through the plug 11.

In Fig. 6, the contact finger 4 is shown as it moves into a pit 86' on the interior of the well pipe 40. When this occurs, the leaf springs 6 move outwardly, thereby urging the enlarged end which is abutting thereagainst upwardly, which in turn moves the rack 26 and pinion 31, so as to give an indication on the meter 36.

The number of elevations at which contact fingers are placed in the device will of course vary with the conditions found to exist within each tubular object to be examined, or with the use to which the pipe has been put. For example, if the pipe has seen little service and has suffered little damage as a result of any corrosive fluid action, five or six elevations of contact fingers may be used since it will be necessary that all or as much as possible of the interior surface of the pipe be engaged by the contact fingers so that the exact condition thereof may be determined.

While the invention has been described with respect to locating pits in well pipe, tubing, casing or the like, it seems obvious that device in accordance with this could be used to determine the interior surface condition of tubular members wherever used.

The construction of the device is such that it can be readily adapted to accommodate either one or more elevations of contact fingers.

Broadly the invention contemplates a device of simple design and easy construction for locating and measuring pits, irregularities, depressions, or the like within a well pipe.

What is claimed is:

1. In a device for locating irregularities on the inside surface of a long string of pipe, a housing, a plurality of elongated spring members circumferentially arranged therein, a contact finger on each of said members urged by said spring members into engagement with the inside surface of the pipe for locating irregularities therein, as said housing is moved therethrough, said housing serving as a base support for said spring members, an axially moveable shaft spring mounted within said housing, said shaft having an enlarged portion therewith having an internally conically tapered surface, said spring members engageable with said surface to cause axial movement of said enlarged portion upon substantially lateral movement of said spring members.

2. A device for locating irregularities on the interior of well pipe comprising a housing, contact fingers mounted within said housing, an opening for each of said fingers in said housing to permit said fingers to move laterally therethrough, each of said contact fingers being fixed to a leaf spring mounted at one end on the inner surface of said housing, a metering head having an internal conical surface, each leaf spring having its free end in engagement with said conical surface, a resilient means urging said metering head axially against said free end of said fingers, the strength of each leaf spring being greater than the strength of said resilient means so that said contact fingers are forced outwardly of said housing when adjacent a pit in the well pipe, whereby the free end of the leaf spring extended furthest outwardly urges said metering head axially in opposition to said resilient means.

3. A device for locating irregularities on the interior of well pipe comprising a housing, contact fingers mounted within said housing, an opening for each of said fingers in said housing to permit said fingers to move laterally therethrough, each of said contact fingers being fixed to a leaf spring mounted at one end on the inner surface of said housing, a metering head having an internal conical surface, each leaf spring having its free end in engagement with said conical surface, a resilient means urging said metering head axially against said free end of said fingers, the strength of each leaf spring being greater than the strength of said resilient means so that said contact fingers are forced outwardly of said housing when adjacent a pit in the well pipe, whereby the free end of the leaf spring extended furthest outwardly urges said metering head axially in opposition to said resilient means, a shaft connected to said metering head extending downwardly therefrom, a tripping finger pivotally mounted on a shear pin on the end of said shaft, an outlet in said housing, said tripping finger normally abutting against said housing during lowering of the device into the pipe and being moveable through said outlet so that upon upward movement of said device said tripping finger engages a pipe coupling or the like in said well pipe to sever said shear pin and release said tripping finger for activation of said metering head and contact fingers.

4. A tripping device for a calipering tool comprising a housing, a shaft mounted in said housing for axial movement, a tripping finger pivotally mounted in proximity to the end of said shaft, a shear pin extending through said finger and said shaft to provide the pivot mounting of said finger, an opening in said housing, said finger being moveable through said opening so that upon upward movement of said tripping device in a well pipe said finger contacts a pipe coupling or the like in the well pipe to sever said shear pin and release said tripping finger from said shaft.

5. In a tubing caliper tool, a housing, a metering head axially moveable within said housing, a shaft connected to said metering head at one end of the shaft, a tripping finger connected adjacent the other end of said shaft to hold said shaft against upward movement, a shear pin holding said finger with said shaft to provide a pivot mounting for said finger, said finger being normally retained within said housing upon downward movement of said tubing caliper tool in a well pipe, and an opening in said housing to enable said tripping finger to pivotally move exterior of said housing for engagement with a pipe coupling or the like upon movement of said tool upwardly in the well pipe to sever said shear pin and release said tripping finger so as to permit upward movement of said shaft relative to said housing.

MYRON M. KINLEY.
JOHN C. KINLEY.

References Cited in the file of this patent

UNITED STATES PATENTS

| Number | Name | Date |
|---|---|---|
| 1,329,456 | Carpenter | Feb. 3, 1920 |
| 2,150,070 | Kregecz | Mar. 7, 1939 |
| 2,235,533 | Roberts | Mar. 18, 1941 |
| 2,281,960 | Vacquier | May 5, 1942 |
| 2,322,343 | Bradon | June 22, 1943 |
| 2,324,865 | Milligan | July 20, 1943 |
| 2,348,643 | Poole | May 9, 1944 |
| 2,362,924 | Pembroke | Nov. 14, 1944 |
| 2,369,909 | Mestas | Feb. 20, 1945 |
| 2,392,357 | Bays | Jan. 8, 1946 |
| 2,398,562 | Russell | Apr. 16, 1946 |
| 2,415,636 | Johnson | Feb. 11, 1947 |
| 2,495,797 | Whitlock et al. | Jan. 31, 1950 |
| 2,518,663 | Chaney et al. | Aug. 15, 1950 |